United States Patent [19]

Wright

[11] Patent Number: 4,466,545
[45] Date of Patent: Aug. 21, 1984

[54] ARTICLE GRADING APPARATUS

[75] Inventor: Raymond G. W. Wright, Hauxton, England

[73] Assignee: Nabisco Brands, Inc., Parsippany, N.J.

[21] Appl. No.: 389,787

[22] Filed: Jun. 18, 1982

[30] Foreign Application Priority Data

Jun. 19, 1981 [GB] United Kingdom ................ 8119056

[51] Int. Cl.³ .......................................... B07B 13/075
[52] U.S. Cl. .................................... 209/684; 209/921; 209/694
[58] Field of Search .............. 209/606, 910, 921, 940, 209/684, 694, 691, 620, 685

[56] References Cited

U.S. PATENT DOCUMENTS 1,675,049  6/1928  Perkins .......................... 209/685 X
3,511,369  5/1970  Chilton .......................... 209/921 X
3,547,249 12/1970  Aquilar et al. ................. 198/774 X Primary Examiner—David A. Scherbel
Assistant Examiner—Glenn Foster
Attorney, Agent, or Firm—Richard Kornutik

[57] ABSTRACT

Potatoes which are to be graded according to their size prior to further processing, for example in the manufacture of a snack food product, are deposited in a hopper 16 at the lower end of an upwardly inclined walking beam conveyor 18. Pockets 35, 37 formed in the conveyor 18 pick up potatoes from the hopper 16 and convey them along the conveyor by transferring each potato from pocket to pocket. Any potatoes whose dimensions are greater than those of the pockets 35, 37 are either not picked up or fall out of the pockets under gravity as the conveyor 18 is operated and drop back into the hopper 16. Periodically, a base wall 17 of the hopper 16 is opened to discharge the accumulated large-size potatoes therefrom.

13 Claims, 3 Drawing Figures

ARTICLE GRADING APPARATUS

This invention relates to grading articles according to their size.

In the production of snack food products such as crisps from potatoes, it is necessary for the potatoes to be graded so that large potatoes can be cut into smaller pieces before being sliced and fried. If such grading and cutting is not performed, then the resultant crisps tend to be large. As a result the crisps are either liable to become trapped in the packet seals during a subsequent packaging operation or alternatively their sharp corners tend to rupture the packet. Conventionally, grading of the potatoes is performed by a conveyor whose flights are formed by a coarse mesh. Smaller potatoes which fall through the mesh are passed on for further processing, while larger potatoes which cannot pass through the mesh are carried along to a cutting station where they are cut into smaller pieces.

It is, however, possible for some potatoes which are large in only one dimension to pass end-on through the mesh of the grading conveyor, so that these potatoes are passed on for further processing without first being cut. These potatoes when sliced may produce oversize crisps which can still become trapped in the packet seals. It is also possible that small potatoes instead of passing through the conveyor mesh sometimes bounce along the conveyor and reach the cutting station. The pieces into which these potatoes are then cut are often too small to produce a usable product, and can disintegrate during frying and thereby contaminate the frying oil. It is therefore necessary to clean the oil at frequent intervals, or otherwise the system which circulates the oil may become blocked by contaminants.

It is an object of the present invention to overcome these problems.

According to one aspect of the present invention, there is provided a method of grading articles according to their size, comprising disposing said articles at an end portion of a walking beam conveyor which is inclined to the horizontal and which includes a plurality of relatively movable pockets, picking up articles in said pockets and conveying them along the conveyor by transferring each article from pocket to pocket, those articles whose dimensions exceed those of the pockets either not being picked up by the pockets or falling out of the pockets under gravity as they are conveyed by the conveyor.

According to a second aspect of the present invention, apparatus for performing such a method comprises a walking beam conveyor which is inclined to the horizontal and which includes a plurality of relatively movable pockets, the pockets being adapted to receive articles therein for conveyance along the conveyor by transferring each article from pocket to pocket, the dimensions of each pocket respectively parallel and perpendicular to the conveying direction being less than the dimensions of those of said articles which are greater than a preselected size.

Advantageously, the articles are contained in a hopper disposed at a lower end portion of the conveyor, and are conveyed upwardly therefrom by the conveyor, such that the those articles which fall out of the pockets drop back into the hopper. The hopper can include an inclined base wall which forms a generally V-shaped space with the conveyor, in which space the articles are contained, such that the hopper can be periodically discharged by movement of the base wall. Desirably, the base wall has slots in an edge thereof adjacent the apex of the V-shaped space to allow the movable members of the conveyor to move therethrough.

The invention will now be further described, by way of example, with reference to the accompanying drawings, in which.

Figure 1:
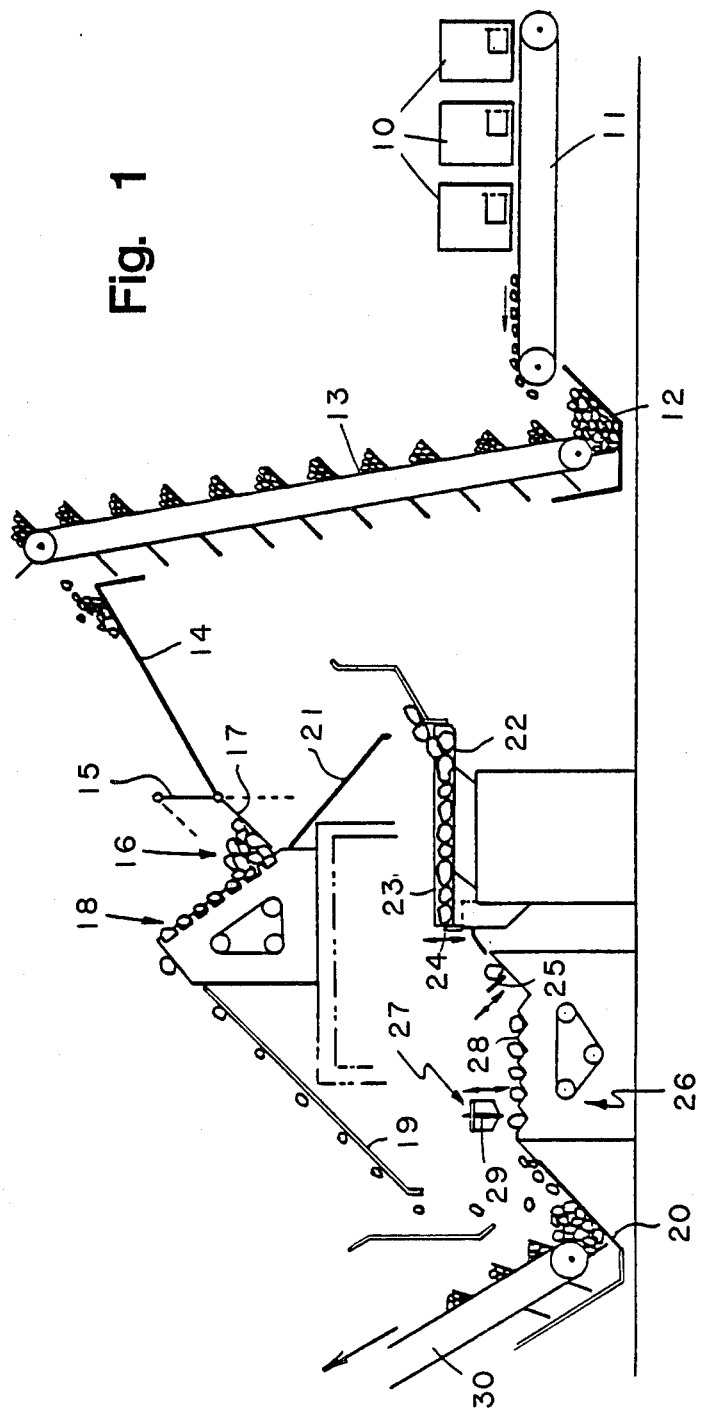
FIG. 1 is a schematic side view of potato processing apparatus.

Referring first to FIG. 1, the apparatus illustrated therein processes potatoes in readiness for the manufacture of a snack food product such as crisps. Initially, potatoes in bulk are supplied to a plurality of peelers 10, and after peeling therein the potatoes are transported by a conveyor 11 to a hopper 12. A lift conveyor 13 takes the peeled potatoes from the hopper 12 and deposits them at a higher level on a chute 14, whereupon the potatoes roll down the chute and are separated into a plurality of inclined channels. Only one of the channels is shown, but it is to be understood that the other channels are identical thereto. At the lower end of each channel, the potatoes come into contact with a gate 15. At timed intervals, the gate 15 is opened to allow the potatoes to fall into a hopper 16 where they rest upon another gate 17. At this point, a grader 18 removes all potatoes smaller than a predetermined size from the hopper 16 and deposits them on a chute 19 where they roll and fall under gravity into an output hopper 20. The manner in which the grader 18 grades the potatoes will be explained in detail later.

Periodically, the gate 17 is opened to allow the large size potatoes remaining in the hopper 16 to roll down a chute 21 onto one end of a vibratory conveyor 22, wherein the potatoes are vibrated into single file in each of a plurality of parallel channels 23 (only one of which is visible in FIG. 1). From each channel 23, the potatoes are discharged one at a time under the control of a pair of gates 24 and 25 onto a feeding mechanism 26 which transports the potatoes to a cutting station 27. In the particular embodiment illustrated, the feeding mechanism 26 is composed of a plurality of walking beam conveyors 28, one for each channel 23, and during the feeding operation the potatoes are orientated and positioned transversely on the conveyors 28 so that they arrive at the cutting station 27 in a predetermined disposition. At the cutting station, a respective cutter 29 cuts the potatoes carried by each conveyor 28 into four roughly equal-sized pieces, which are then discharged into the output hopper 20. Because each potato is delivered to the cutter 29 in a predetermined disposition, the potato will always be cut into pieces which are sufficiently small for further processing, irrespective of the size and shape of the potato. There is therefore no need to re-grade the potato pieces before they are passed on to the next stage in the process. The mechanism which makes this possible forms the subject of our co-pending U.K. patent application No. 8119057 of even date entitled "Potato Processing Apparatus".

From the output hopper 20, the potato pieces from the cutting station 27 and the whole, small-sized potatoes from the chute 19 are transported by a lift conveyor 30 for further processing into the snack food product. In the case of crisps, such further processing would include slicing, quality inspection, frying and packaging.

Figure 2:
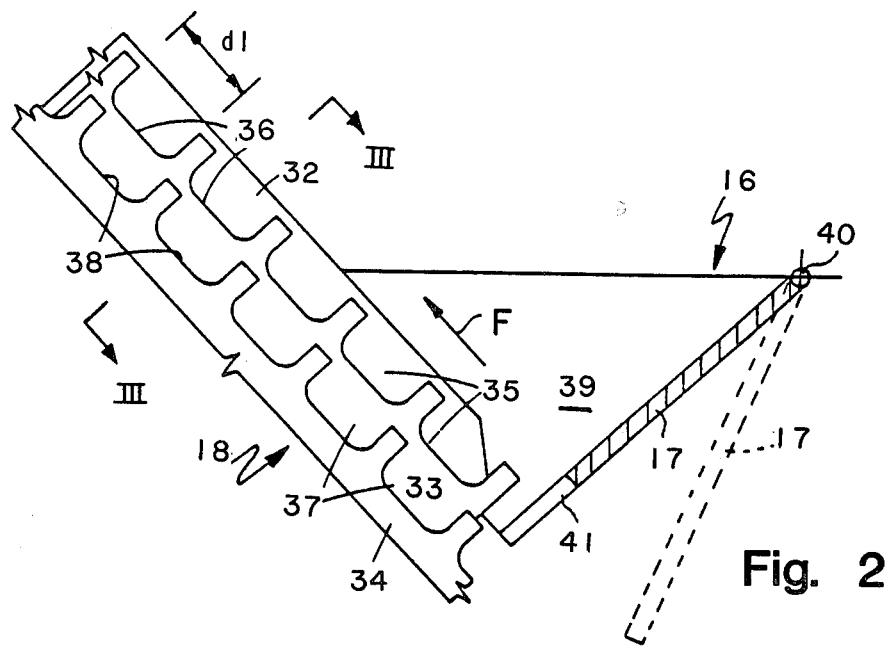
FIG. 2 is a schematic sectional side view of a grader according to the present invention which forms part of the apparatus shown in FIG. 1.
Figure 3:
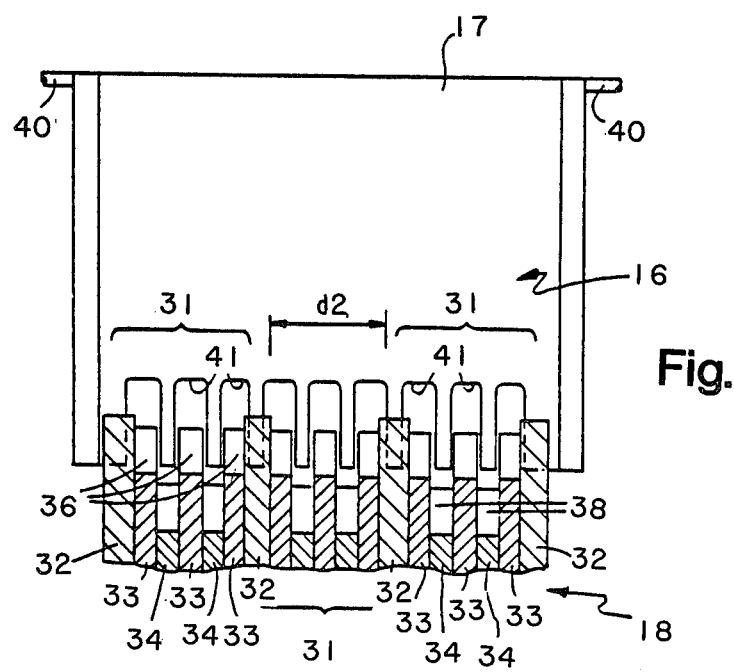
FIG. 3 is a section taken along the line III—III in FIG. 2.

The grader 18 is shown in detail in FIGS. 2 and 3, and comprises a walking beam conveyor which is inclined upwardly. The conveyor includes three separate channels 31 along which the potatoes in the hopper 16 are conveyed, each channel being formed between a pair of fixed side walls 32. A fixed structure of the conveyor includes, in each channel 31, three flat members 33 disposed in parallel, transversely spaced-apart relationship between the side walls 32. A movable structure of the conveyor includes in each channel 31 two flat members 34 which are also disposed in parallel, transversely spaced-apart relationship and which are interleaved with the fixed members 33.

A plurality of fixed pockets 35 are provided in the fixed structure in each channel 31, each pocket being formed by respective transversely aligned recesses 36 in upwardly-directed edges of the members 33. The movable structure is similarly provided with a plurality of movable pockets 37 in each channel, each pocket 37 being defined by respective transversely aligned recesses 38 in upwardly-directed edges of the members 34. As with a conventional waling beam, the conveyor is operated by a cyclic movement of the movable structure with respect to the fixed structure along a closed path, which closed path includes an upward component wherein each movable pocket 37 moved upwardly through a respective one of the fixed pockets 35, a forward component in the direction of arrow F in FIG. 2, a downward component wherein each movable pocket 37 moves downwardly through the next fixed pocket 35 in line, and a return component in the opposite direction to arrow F. This action serves to transport a potato held in one fixed pocket to the next succeeding fixed pocket in the same channel 31, and is repeated to obtain continuous transport of the potatoes along the conveyor.

In the illustrated arrangement, each recess 36 and 38 has a dimension $d_1$ (FIG. 2) in the direction of arrow F. Therefore, only potatoes having a dimension less than $d_1$ will be picked up by the movable pockets 37 of the conveyor as they undergo the above-described cyclic movement. The side walls 32 of each channel 31 are separated by a distance $d_2$ (FIG. 3), and any potatoes which have been picked up and which are wider than $d_2$ will be lifted out of the movable pockets 37 by the side walls 32 as the pockets move below the level of the latter, so that these potatoes fall under gravity back into the hopper 16. In the event of a potato being picked up which although having dimensions less than $d_1$ and $d_2$ is relatively long in its remaining dimension and is therefore unbalanced, the cyclic movement of the movable structure will cause the potato to topple out of the conveyor and back into the hopper 16. Thus, the walking beam conveyor is effective in removing from the hopper 16 only those potatoes which are smaller in size than the dimensions $d_1$ and $d_2$. Moreover, the conveyor is capable of producing a substantially continuous output of small-sized potatoes from its upper end even though the ungraded potatoes are supplied to the hopper 16 in batches, in contrast to the conventional coarse mesh grading conveyor described previously.

As mentioned above, the large-size potatoes remaining in the hopper 16 can be discharged periodically by opening the gate 17. The gate 17 is in fact formed by an inclined base wall of the hopper 16 which defines a generally V-shaped space 39 with the conveyor, and the gate is opened by pivoting the base wall (as indicated in broken lines in FIG. 2) about a pivot axis 40 at its upper edge. Adjacent the apex of the V-shaped space 39, an edge of the base wall has slots 41 therein which allow the members 34 of the movable conveyor structure to pass therethrough during part of the cyclic movement of the latter.

I claim:

1. A method of grading articles according to their size, comprising disposing said articles at an end portion of a walking beam conveyor (18) which is inclined to the horizontal and which includes a plurality of relatively movable pockets (35,37), picking up articles in said pockets (35, 37) and conveying them along the conveyor (18) by transferring each article from pocket to pocket, characterised in that the dimensions ($d_1$, $d_2$) of each pocket (35, 37) respectively parallel and lateral to the conveying direction are less than the dimensions of those of said articles which are greater than a preselected size, and the articles whose dimensions exceed those of the pockets (35, 37) are either not picked up by the pockets or fall out of the pockets under gravity as they are conveyed by the conveyor (18).

2. A method as claimed in claim 1, wherein said articles are contained in a hopper (16) disposed at a lower end portion of the conveyor (18) and conveying said articles upwardly therefrom by the conveyor, such that those articles which fall out of the pockets (35, 37) drop back into the hopper (16).

3. A method as claimed in claim 2, further comprising periodically discharging the articles remaining in the hopper (16).

4. A method as claimed in claim 3, wherein the hopper (16) has an inclined base wall (17) which forms a generally V-shaped space (39) with the conveyor (18), in which space said articles are disposed, and the periodic discharge of the articles remaining in the hopper (16) is performed by moving the base wall (17).

5. Apparatus for performing a method as claimed in claim 1, comprising a walking beam conveyor (18) which is inclined to the horizontal and which includes a plurality of relatively movable pockets (35, 37) the pockets being adapted to receive articles therein for conveyance along the conveyor (18) by transferring each article from pocket to pocket, characterised in that the dimensions of each pocket (35, 37) respectively parallel and lateral to the conveying direction are less than the dimensions of those of said articles which are greater than a preselected size.

6. Apparatus as claimed in claim 5, werein the walking beam conveyor (18) comprises first and second sets of pockets (35, 37) which are relatively movable, said articles being held in the pockets (37) of the first set while they are transferred between adjacent pockets (35) in the second set.

7. Apparatus as claimed in claim 6, wherein the pockets (35, 37) in each set are defined by transversely aligned recesses (36, 38) in a series of mutually parallel members (33, 34) and the members (34) defining the pockets (37) of the first set are interleaved with the members (33) defining the pockets (35) of the second set.

8. Apparatus as claimed in claim 7, wherein the walking beam conveyor (18) further comprises fixed side walls (32) between which said interleaved members (33,34) are disposed.

9. Apparatus as claimed in claim 6, 7 or 8, wherein one of the set of pockets (35) is fixed and the other set of pockets (37) is movable relative thereto.

10. Apparatus as claimed in claim 5, further comprising a hopper (16) in which said articles are contained, the hopper being disposed at a lower end portion of the walking beam conveyor (18) and the conveyor being arranged to convey said articles upwardly therefrom.

11. Apparatus as claimed in claim 10, wherein the hopper (16) includes an inclined base wall (17) which forms a generally V-shaped space (34) with the conveyor (18), in which space said articles are contained, and the hopper (16) can be discharged by moving the base wall (17).

12. Apparatus as claimed in claim 7, further comprising a hopper (16) in which said articles are contained, the hopper being disposed at a lower end portion of the walking beam conveyor (18) and the conveyor being arranged to convey said articles upwardly therefrom.

13. Apparatus as claimed in claim 12, wherein the hopper (16) includes an inclined base wall (17) which forms a generally V-shaped space (39) with the conveyor (18), in which space said articles are contained, and the base wall (17) has slots (41) in an edge thereof adjacent the apex of the V-shaped space (39) to permit said members (34) defining the pockets (35) to move therethrough.

* * * * *